F. C. MAEGLY.
SCALE TICKET.
APPLICATION FILED DEC. 30, 1907.
918,067.
Patented Apr. 13, 1909.
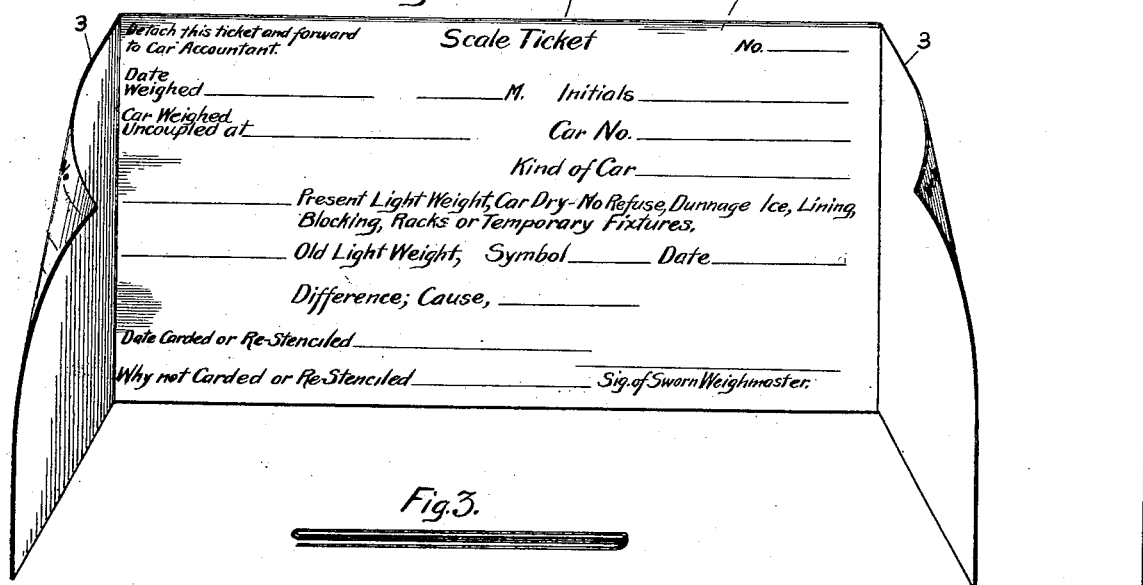

UNITED STATES PATENT OFFICE.

FREDERICK C. MAEGLY, OF CHICAGO, ILLINOIS.

SCALE-TICKET.

No. 918,067.  Specification of Letters Patent.  Patented April 13, 1909.

Application filed December 30, 1907. Serial No. 408,548.

*To all whom it may concern:*

Be it known that I, FREDERICK C. MAEGLY, a citizen of the United States, residing at Chicago, in the county of Cook and State of Illinois, have invented certain new and useful Improvements in Scale-Tickets, of which the following is a specification.

The object of my invention is to provide an improved record card or scale ticket to be used by weighmasters, the ticket being provided with a rigid base and a plurality of sheets of paper coated on one side with a transfer medium, said sheets being so attached to the rigid base that they may be folded thereover.

As is well-known, railroad track scales are generally provided with an automatic printing device whereby the weights are recorded.

One of the objects of my invention is to provide means whereby when such printing scales are used, or when the weights are recorded in hand writing, a plurality of records may be made, thus avoiding the errors incident to copying such records.

My improved ticket is adapted for use either in connection with the weighing of cars for the purpose of marking the light weights thereon or in connection with the billing of freight. Under the present system of making a single record of the weights shown by the track scales, it is generally necessary that the figures be transcribed one or more times, or communicated by telephone, or otherwise prior to reaching the party who makes out the way-bill or the party who actually paints the weight upon the car. In fact, my improved scale ticket is susceptible of use for any purpose requiring a convenient manifold card so constructed as to be capable of use with a type registering device or as a means of making notes in the field where ordinary office conveniences are not available.

In the drawings—Figure 1 is an edge view of my improved scale ticket; Fig. 2 is a face view of the same, and Fig. 3 is a view of the ticket with the flaps or leaves folded into position for making a record.

The scale ticket comprises a rigid central portion 2 to which is secured a strip of paper 3 projecting at each end beyond the ends of the rigid base 2 a distance substantially equal to the length of the base. The base 2 is preferably formed of cardboard of sufficient rigidity to receive a good impression from a lead pencil. The side of the base opposite to that to which the strip of paper is secured bears a printed blank form. The form illustrated in the drawing is more particularly adapted for use when the scale ticket is used for the purpose of recording the light weights of cars.

As is well-known, freight cars when manufactured are weighed empty and the empty or light weight painted on the sides thereof. Owing to the drying of the wood-work of cars, the making of repairs and substitution of new parts for injured ones, and the placing of special fixtures in cars for the purpose of transporting different classes of freight, the light weight changes materially from time to time, thus leading to inaccuracy in the billing of freight, the weight of which is ascertained by deducting the light weight of the car from its loaded weight.

The blank form shown upon the scale ticket in the drawings is especially adapted to use as a means of recording the light weight of a car when it is reweighed. The unreliability of light weights upon cars has become so well-known that many shippers employ special weighmasters and provide themselves with track scales for the purpose of weighing each car before it is loaded and afterward. The new light weights so obtained, however, are merely used for the purpose of the particular shipment occurring at that time, and the car proceeds with the old inaccurate weight as originally painted upon it. My improved ticket affords convenient means for perpetuating the light weights so ascertained, and the different parts of the ticket may be forwarded to the proper officials for use in remarking the car.

The blank upon the scale ticket illustrated is provided with spaces for the car number, the date weighed, place weighed, the kind of car, such as cattle car, freight car and tank car, the present light weight, the old light weight, the difference between the old and new light weights, the cause therefor, the date when new light weight card was applied to the car, or such new light weight stenciled thereon, and the signature of the weighmaster, together with such other data as may be desired. Similar blank forms are printed upon the projecting ends of the strip of paper in such manner that when such projecting ends are folded over the rigid base they will lie uppermost and in registry with the form upon the printed base. The reverse side of the projecting ends of the strip of paper are treated with manifold material, whereby when the projecting ends of the strip are folded over the base two copies of the record made upon the uppermost sheet are made, one copy upon the other end of the strip of paper and the second upon the rigid base. One of these copies, preferably the rigid base, may be retained in the files of the station agent, another forwarded to the car accountant, and the third to the superintendent or other official having need for the same.

When an empty car is weighed, the weighmaster may use the scale ticket for the purpose of having proper record of the new light weight placed upon the car side, which in most cases may be accomplished before the car has been taken from the yards or siding at the place where weighed. In case, however, that the card has been removed, the scale ticket will be forwarded to the place where the car is located, which location may be readily ascertained through the usual records kept by the car accountant or other official. The responsibility for the proper weighing of the cars may be absolutely fixed by means of the signatures upon the scale tickets. Upon the back of the rigid base of the scale ticket suitable instructions may be printed.

It will be obvious that certain variations may be made in the construction of my improved scale ticket, and especially in the mode of attaching the projecting ends or leaves thereto, without departing from the spirit of my invention. I would have it understood, therefore, that I do not desire to limit myself to the precise construction and arrangement of parts shown in the drawings and herein described, as various modifications or alterations may be made without departing from my original invention.

What I claim is:

1. A record card comprising a rigid central portion, a strip of paper affixed thereto and projecting beyond the same at each end, and a transfer medium upon the projecting ends of said strip of paper.

2. A record card comprising a rigid central portion, a strip of paper affixed thereto and projecting beyond the same at each end, and a transfer medium upon the projecting ends of said strip of paper, said central portion and projecting ends being provided with blank forms so positioned as to register when said projecting ends are folded over said central portion.

3. A record card comprising a rigid base, and leaves affixed to said base and projecting beyond the same, said leaves being coated with transfer medium.

4. A record card comprising a rigid base, leaves affixed thereto and projecting beyond the same, and transfer medium upon said leaves, said rigid base and leaves being provided with blank forms so positioned as to register when said leaves are folded over said base.

FREDERICK C. MAEGLY.

Witnesses:
WALTER A. SCOTT,
ANNIE C. COURTNEY.